(12) United States Patent
Herfst et al.

(10) Patent No.: US 11,698,389 B2
(45) Date of Patent: Jul. 11, 2023

(54) PROBE, METHOD OF MANUFACTURING A PROBE AND SCANNING PROBE MICROSCOPY SYSTEM

(71) Applicant: Nederlandse Organisatie voor toegepast-natuurwetenschappelijk onderzoek TNO, 's-Gravenhage (NL)

(72) Inventors: Roelof Willem Herfst, Capelle aan den Ijssel (NL); Albert Dekker, Delft (NL); Anton Adriaan Bijnagte, Tricht (NL); Jan Jacobus Benjamin Biemond, Barendrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 590 days.

(21) Appl. No.: 16/760,210

(22) PCT Filed: Oct. 31, 2018

(86) PCT No.: PCT/NL2018/050725
§ 371 (c)(1),
(2) Date: Apr. 29, 2020

(87) PCT Pub. No.: WO2019/088833
PCT Pub. Date: May 9, 2019

(65) Prior Publication Data
US 2023/0160924 A1 May 25, 2023

(30) Foreign Application Priority Data
Nov. 1, 2017 (EP) .................................. 17199494

(51) Int. Cl.
*G01Q 70/02* (2010.01)
*G01Q 70/16* (2010.01)
*G01Q 70/10* (2010.01)

(52) U.S. Cl.
CPC ............. *G01Q 70/02* (2013.01); *G01Q 70/10* (2013.01); *G01Q 70/16* (2013.01)

(58) Field of Classification Search
CPC ......... G01Q 70/02; G01Q 70/10; G01Q 70/16
(Continued)

(56) References Cited

U.S. PATENT DOCUMENTS 5,959,200 A 9/1999 Chui et al.
6,935,167 B1 8/2005 Sahin et al.
(Continued)

FOREIGN PATENT DOCUMENTS

WO WO 2000/46559 A1 8/2005
WO WO 2011/038470 A4 4/2011

OTHER PUBLICATIONS

Jeong, et al. "Design and Fabrication of an Active Multiaxis Probing System for High Speed Atomic Force Microscopy," IEEE Transactions on Nanotechnology, vol. 9-3, pp. 392-399 (May 3, 2010).
(Continued)

*Primary Examiner* — Nicole M Ippolito
(74) *Attorney, Agent, or Firm* — Leydig, Voit & Mayer, Ltd.

(57) ABSTRACT

This document relates to a probe for use in a scanning probe microscopy device. The probe comprises a cantilever and a probe tip being located at a first end section of the cantilever. The cantilever is configured for bending in a Z-direction perpendicular to a surface of a substrate in use. The cantilever comprises a neck section and a paddle section, and the probe tip is located on the paddle section. The neck section has a width and height in cross section thereof, comprises a base part having a rectangular cross section. The cantilever at least across a length of the neck section comprises a ridge extending in a direction away from the base part. The base part and the ridge together define the width and height of the
(Continued)

neck section, and have dimensions such that a vertical bending stiffness of the cantilever for bending in the Z-direction matches a lateral stiffness of the cantilever with respect to forces acting on the probe tip in a direction transverse to the Z-direction. The document further describes a manufacturing method.

20 Claims, 3 Drawing Sheets

(58) Field of Classification Search
USPC .......................................................... 850/53
See application file for complete search history.

(56) References Cited

U.S. PATENT DOCUMENTS

| | | | | |
|---|---|---|---|---|
| 2007/0151989 A1* | 7/2007 | Espinosa | ................ | G01N 27/02 222/462 |
| 2008/0134771 A1* | 6/2008 | Schimmel | .............. | B82Y 35/00 73/104 |
| 2019/0003941 A1* | 1/2019 | Wikswo | ................... | G01N 3/20 |

OTHER PUBLICATIONS

European Patent Office, International Search Report in corresponding International Application No. PCT/NL2018/050725, dated Mar. 26, 2019 (3 pages).

\* cited by examiner

PROBE, METHOD OF MANUFACTURING A PROBE AND SCANNING PROBE MICROSCOPY SYSTEM

CROSS-REFERENCE TO RELATED APPLICATIONS

This patent application is a U.S. National Phase of PCT International Application No. PCT/2018/050725, filed Oct. 31, 2018, which claims priority to European Application No. 17199494.0, filed Nov. 1, 2017, which are both expressly incorporated by reference in their entireties, including any references contained therein.

FIELD OF THE INVENTION

The present invention is directed at a probe for use in a scanning probe microscopy device for measuring features on a surface of a substrate, the probe comprising a cantilever and a probe tip, the probe tip being located at a first end section of the cantilever, the cantilever having a second end section on an opposite side, and the cantilever having a longitudinal shape, wherein the cantilever is configured for bending in a Z-direction perpendicular to the surface of the substrate in use, wherein the cantilever comprises a neck section and a paddle section, wherein the probe tip is located on the paddle section, and wherein the neck section has a width and height in cross section thereof.

The invention is further directed at a method of manufacturing a probe for use in a scanning probe microscopy device for measuring features on a surface of a substrate, the method comprising the steps of: providing the probe to comprise a cantilever and a probe tip, wherein the probe tip is located at a first end section of the cantilever and wherein the cantilever has a second end section on an opposite side, wherein the cantilever is formed to have a longitudinal shape for enabling bending in a Z-direction perpendicular to the surface of the substrate in use, wherein the step of providing the probe comprises forming the cantilever to comprise a neck section and a paddle section, and forming the probe tip to be located on the paddle section, and wherein the neck section is formed to have a width and height in cross section thereof.

The invention is further directed at a scanning probe microscopy system comprising a probe as described above.

BACKGROUND

Scanning probe microscopy systems are typically provided using a probe having a cantilever that is optimized for bending in a Z-direction, i.e. perpendicular to the surface to be scanned. This is considered beneficial in order to map height differences at the surface, such as to map structural features. Providing the probe having a low bending stiffness in the Z-direction enables the cantilever to bend significantly upon encountering a height difference, and thereby improves it's sensing accuracy. Likewise, disturbance factors during measurement are to be eliminated and reduced as much as possible.

Although probes as described above fulfill the requirements for sensing under straightforward conditions, sensing under more difficult conditions with probes of this kind may be challenging. For example, for measuring high aspect ratio features on a substrate surface, probes are in some measurement solutions to be angled relative to the surface. In other applications of scanning probe microscopes, lateral vibrations or forces need to be sensed along with vertical motion of probe tips.

SUMMARY OF THE INVENTION

It is an object of the present invention to provide a probe for use in a scanning probe microscopy device or system, wherein the probe has similar sensing and interaction behaviour in vertical and lateral direction. It is a further object of the invention to provide a manufacturing method for providing such probes.

To this end, in accordance with a first aspect, there is provided herewith a probe for use in a scanning probe microscopy device for measuring features on a surface of a substrate, the probe comprising a cantilever and a probe tip, the probe tip being located at a first end section of the cantilever, the cantilever having a second end section on an opposite side, and the cantilever having a longitudinal shape, wherein the cantilever is configured for bending in a Z-direction perpendicular to the surface of the substrate in use, wherein the cantilever comprises a neck section and a paddle section, wherein the probe tip is located on the paddle section, and wherein the neck section has a width and height in cross section thereof, wherein the neck section comprises a base part having a rectangular cross section, and wherein the cantilever at least across a length of the neck section comprises a ridge extending in a direction away from the base part, such that the base part and the ridge together define the width and height of the neck section, wherein the ridge and the base part have dimensions such that a vertical bending stiffness of the cantilever for bending in the Z-direction matches a lateral stiffness of the cantilever with respect to forces acting on the probe tip in a direction transverse to the Z-direction.

Underlying the present invention is the insight that regular cantilever designs have a lateral stiffness that is much larger than the vertical stiffness. In accordance with the present invention, when the effective lateral stiffness of the cantilever is matched with the vertical bending stiffness, the probe becomes configured for enabling sensing in two degrees of freedom, i.e. in the Z-direction and in the Y-direction lateral thereto. This is beneficial in various kinds of applications, such as sensing of high aspect ratio features or the sensing of lateral vibrations or shear waves at a substrate surface. In such applications, sensitivity of the probe to lateral forces acting on the probe tip is desired. Such forces act on the apex of the probe tip when it is in contact with the substrate and will result in torsion of the cantilever. This torsion can be measured, for example by means of optical beam deflection. The amount of torsion in response to a lateral force determines the sensitivity of the probe to lateral forces. The term 'lateral stiffness' as used in this document is in fact an effective lateral stiffness that is provided by the combination of a torsional stiffness of the cantilever and a height of the probe tip (i.e. the distance between the apex and the base of the tip). In a formula, the effective lateral stiffness of a cantilever may be calculated as follows:

$$\text{lateral stiffness} = \text{torsional stiffness}/(\text{tip height})^2$$

Herein, the torsional stiffness is dependent on the dimensions, the shape and the material of which the cantilever is made.

Matching of the vertical bending stiffness and the lateral stiffness is achieved by having a paddle/spoon structure. The probe is formed having a neck section and a paddle section. The neck section lowers the lateral stiffness. To match the lateral stiffness with the vertical or Z-direction bending stiffness, a ridge may be added in the longitudinal direction to the cantilever, i.e. spanning at least the neck section, but in some embodiments spanning between the probe tip and the second end section of the cantilever. The ridge, which extends from a base part in a direction away from it, increases the vertical bending stiffness such as to match it to the lateral stiffness. For example the ridge may extend transverse to a plane parallel to the paddle section, and hence in the Z-direction. The combination of a flat base part having a rectangular cross section characterized by a thickness and a width, with a ridge extending transverse to the base part in the longitudinal direction, allows tuning of the vertical and lateral stiffness without too much mass gain of the cantilever. The inertial moment of the cantilever thus remains small, and the resonance frequency may be kept high. In accordance with some embodiments, the neck section is formed by the base part and the ridge and has a T-shaped cross-section. The symmetry of a T-shape keeps the cantilever in balance whilst achieving the desired proportion between the vertical bending stiffness and the lateral stiffness.

In some embodiments, the probe tip comprises a triangular cross section having a base width and a tip height. The probe tip may, in accordance with some embodiments, further comprise a high aspect ratio whisker or HAR whisker (sometimes referred to as 'whisker'), extending from the apex of the tip in the longitudinal direction of the tip (i.e. away from the base). The whisker may be a narrow extension of the tip. For example, a whisker may itself consist of a whisker base and a whisker tip height, wherein the whisker tip height is larger than the whisker base width. In particular, in some embodiments, a ratio between the whisker tip height and the whisker base width is defined as h:b, wherein h is at least 4 while b equals 1. and the whisker may be applied to measure high aspect ratio features. Occasionally, there is not a clear distinction between the whisker and the apex of the probe tip—and the probe tip may gradually extend into a whisker at its end. The tip height, as used in this document, is determined from the base to the end of the tip, which may be the apex of the tip or the end of the whisker.

In particular, in preferred embodiments, the effective lateral stiffness of the cantilever is of a same order as a lateral bending stiffness of the whisker. For example, the effective lateral stiffness of the cantilever may be within 125% of the lateral bending stiffness of the whisker or smaller than or equal to the lateral bending stiffness of the whisker. This results in the probe being sufficiently sensitive to measure the small lateral forces acting on the whisker when the whisker is angled by rotation around it's longitudinal axis to measure a high aspect ratio feature such as a deep trench in a surface. The small or comparable lateral stiffness then results in a torsion of the cantilever that may well be measured, providing a well measurable output signal. In conventional probes, the high lateral stiffness typically suppresses the lateral signal, which thereby cannot be measured accurately. High aspect ratio features are therefore typically measured in different ways.

In accordance with a second aspect of the invention, there is provided a method of manufacturing a probe for use in a scanning probe microscopy device for measuring features on a surface of a substrate, the method comprising the steps of providing the probe to comprise a cantilever and a probe tip, wherein the probe tip is located at a first end section of the cantilever and wherein the cantilever has a second end section on an opposite side, wherein the cantilever is formed to have a longitudinal shape for enabling bending in a Z-direction perpendicular to the surface of the substrate in use, wherein the step of providing the probe comprises: forming the cantilever to comprise a neck section and a paddle section, and forming the probe tip to be located on the paddle section, and wherein the neck section is formed to have a width and height in cross section thereof, and wherein the width and height of the neck section are dimensioned such that a vertical bending stiffness of the cantilever for bending in the Z-direction matches a lateral stiffness of the cantilever with respect to forces acting on the probe tip in a direction transverse to the Z-direction.

In accordance with a third aspect of the invention, there is provided a scanning probe microscopy system configured for measuring features on a surface of a substrate, the system comprising a probe according to the first aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
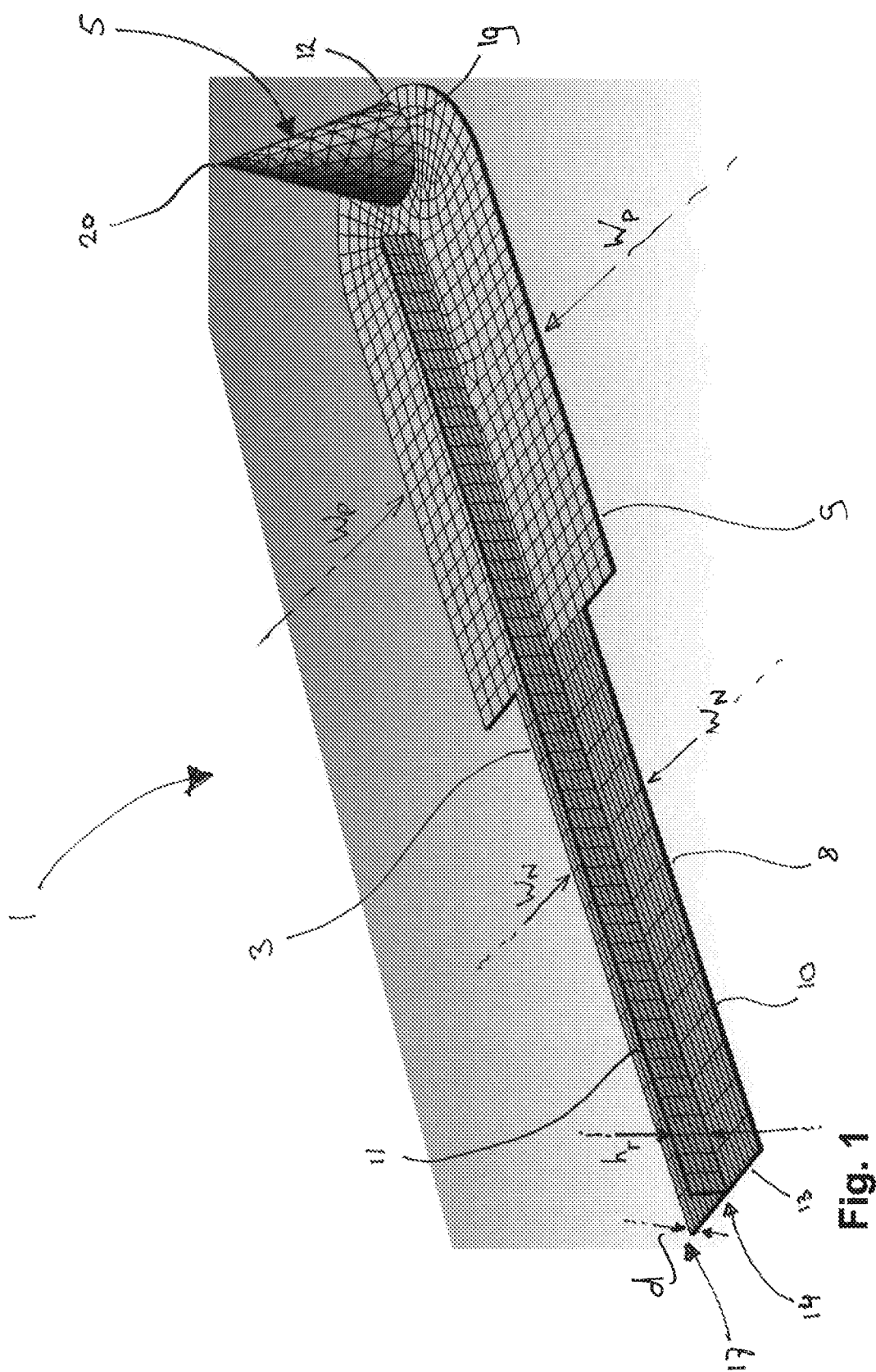
FIG. 1 schematically shows a probe design in accordance with the present invention.

For accurate sub-resonant AFM imaging of high aspect ratio structures, accurate sensing of both vertical and lateral forces and position is vital. However, in order to measure high aspect ratio structures (HAR), a HAR tip is required as well. Such a HAR tip tends to have a low bending stiffness, so that lateral forces can easily bend it. If the torsional stiffness of a probe is too high, the lateral forces that induce the bending cannot be sensed accurately. The invention is based on the insight that for sub-resonant imaging HAR mode it is desirable to have similar sensing and interaction behavior in vertical and lateral direction. This is also desirable in respect of applications wherein lateral forces are to be determined for other purposes, such as to measure shear waves.

Regular cantilevers have an effective lateral stiffness that is much larger than the vertical stiffness. Note that the effective lateral stiffness of a cantilever may be calculated as follows:

$$\text{lateral stiffness} = \text{torsional stiffness}/(\text{tip height})^2$$

Herein, the torsional stiffness is dependent on the dimensions, the shape and the material of which the cantilever is made. References in this document to the 'lateral stiffness' of the probe or cantilever in fact are references to the above effective lateral stiffness that results from a combination of the torsional stiffness of the cantilever and the height of the tip. Together with the previously noted low bending stiffness of the HAR end of a regular probe tip, this large effective lateral stiffness of regular probes results in a low sensitivity for lateral forces. Therefore, in accordance with the invention, as a design criterion, the effective lateral stiffness of probes in accordance with the present invention should be comparable to or lower than the lateral bending stiffness of the HAR whisker.

In accordance with design criteria of the invention, a vertical stiffness of cantilever is equal to or comparable to total lateral stiffness, where the total lateral stiffness is the result of the bending stiffness of the tip in series with the torsional stiffness of the cantilever. Moreover, in some embodiments, a total lateral stiffness is not dominated by the bending stiffness of the HAR tip, i.e. the lateral stiffness of the cantilever is comparable to the bending stiffness of the whisker.

Furthermore, in some embodiments, the probe design may be optimized for providing a high resonance frequency. Embodiments to realize this can use one or more of the following design features: cantilevers having sections of varying width (e.g. a neck and paddle design); a strategically placed reinforcing rib that increases the vertical stiffness significantly while increasing torsional stiffness by a relatively small amount (for example a T-shaped cantilever); or strategically placed cuts in the cantilever structure to reduce torsional stiffness.

A probe in accordance with the invention may consist of a cantilever with a tip attached to this. The tip consists of a stiff base from which it extends towards an apex, and may further comprise a high aspect ratio (HAR) part (herein called 'whisker') extending from the apex. We define vertical stiffness $k_z$ as $dF_z/dz$, and total lateral stiffness $k_{y,tot}$ as $dF_y/dy$. The total lateral stiffness $k_{y,tot}$ is the result of placing the cantilevers lateral stiffness $k_{y,cant}$ (=torsional stiffness/ (tip height)$^2$) in series with the whisker.

FIG. 1 schematically shows a probe design in accordance with the present invention. The probe 1 comprises a cantilever 3 and a probe tip 5. The probe tip is triangular in cross-section, having a base 19 and apex 20. Probe tip 5 may comprise a HAR whisker, a narrow extension which extends from the apex 20. In use, the apex 20 or alternatively the end of the whisker, is to be brought in contact with the substrate for performing measurements. For example, the probe tip 5 may be scanned across the surface of a substrate to map surface features.

The cantilever 3 consists of a paddle section 9 and a neck section 8. The neck section 8 has a width $W_N$ that is smaller than the width $W_P$ of the paddle section 9. The neck section 8 comprises a base part 10 having a thickness d (or plate thickness d) as indicated by reference numeral 17. The probe tip 5 is located at a first end section 12 of the cantilever 3. The opposite second end section 13 reveals the cross section 14 of the neck section 8, and is typically attached to the probe chip (or integrally formed therewith). The probe chip (not shown) is to be attached to a scan head of a scanning probe microscopy device, e.g. by clamping, suction, an electrostatic force, magnetic force, or different. A ridge 11 extends between the second end section 13 and the probe tip 5 (with a slight gap between the tip 5 and the end of the ridge 11). The ridge 11 extends in a transverse direction relative to the base part 10 and paddle section 9. The height of the ridge 11, as measured from the base part 10, is given by $h_r$.

With the ridge 11, the cross section 14 of the neck section 8 is T-shaped. Advantageously, the ridge 11 increases the vertical stiffness of the cantilever 3, so that the vertical stiffness of the neck section 8 can be made to match the lateral stiffness. The reduced width $W_N$ of the base part 10 of neck section 8 as compared to the width $W_P$ of the paddle section 9, decreases the torsional stiffness, such that the effective lateral stiffness can be made to match the bending stiffness of the whisker 5. By increasing the vertical stiffness with the additional ridge 11, the three parameters can be matched to fulfill the design criteria proposed by the present invention.

In accordance with embodiments of manufacturing methods as proposed by the present invention, vertical and lateral stiffness may be independently tuned by either one of adjusting the shape of the cantilever (e.g. using alternatives to a rectangular beam), adding one or more reinforcing ridges 11, or adjusting plate thickness d of base part 10. The overall performance is best when all these three tuning possibilities are applied in concert. In addition to this, key sections of the cantilever 3 may be stiffened further by adding further ridges, for example the paddle section 9 (i.e. not the neck section 8).

In accordance with embodiments of probes of the present invention, a width to height aspect ratio of the neck section 8 is defined as a ratio between a maximum width and a maximum height measured in cross section transverse to a notional longitudinal axis through the neck section 8 and calculated as the maximum width divided by the maximum height. The cantilever 3 in such embodiments may comprise at least one section having a width to height aspect ratio smaller than 10, preferably smaller than 5.5, more preferably smaller than 3. For probes in accordance some embodiments, the width $W_N$ of the neck section 8 is within a range of 1 micrometer to 15 micrometer. For example, the width of the base part 10 of the neck section 8 may be 1, 2, 3, 4, 5, 6, 7, 8, 9, 10, 11, 12, 13, or 14 micrometer. A thickness d of the base part 10 is within a range of 250 nanometer to 1250 nanometer. For example, the thickness d may be 250 nanometer, 500 nanometer, 750 nanometer, 1000 nanometer, or 1250 nanometer. The length of the neck section 8 in longitudinal direction is within a range of 2.5 to 30 micrometer. For example, the length may be 2.5 micrometer, 5 micrometer, 7.5 micrometer, 10 micrometer, 12.5 micrometer, 15 micrometer, 17.5 micrometer, 20 micrometer, 22.5 micrometer, 25 micrometer, 27.5 micrometer, or 30 micrometer. The width of the ridge 11 is within a range of 2 to 14 micrometer. For example, the width may be 2 micrometer, 3 micrometer, 4 micrometer, 6 micrometer, 8 micrometer, 10 micrometer, 12 micrometer, or 14 micrometer. The height of the ridge 11 is within a range of 0.5 to 5 micrometer, and may for example be any of 0.5, 1, 1.5, 2, 3, 4, or 5 micrometer. Good results have been achieved with a ridge height $h_r$ of 1.5 micrometer. Furthermore, the length of the ridge 11 is within a range of 2.5 to 30 micrometer, and may for example be 2.5 micrometer, 5 micrometer, 7.5 micrometer, 10 micrometer, 12.5 micrometer, 15 micrometer, 17.5 micrometer, 20 micrometer, 22.5 micrometer, 25 micrometer, 27.5 micrometer, or 30 micrometer.

In particular probe designs that have been simulated, the height of the ridge was 1.5 micrometer. Moreover, in a first of these simulated embodiments the width of the neck section is 3 micrometer and the length of the neck section is 30 micrometer. In a second of these simulated embodiments, the width of the neck section is 3 micrometer and the length of the neck section is 17.5 micrometer. In a third of these simulated embodiments, the width of the neck section is 4 micrometer and the length of the neck section is 17.5 micrometer. In a fourth of these simulated embodiments, the width of the neck section is 6 micrometer and the length of the neck section is 7.5 micrometer. In a fifth of these simulated embodiments, the width of the neck section is 8 micrometer and the length of the neck section is 7.5 micrometer. In a sixth of these simulated embodiments, the width of the neck section is 14 micrometer and the length of the neck section is 2.5 micrometer. Table I below provides the simulation results for these embodiments.

TABLE 1

| Neck L (um) | Neck W (um) | Ridge H (um) | $k_z$ (N/m) | $S_{Fz}$ (rad/N) | $k_y$ (N/m) | Corr. $S_{Fy}$ (rad/N) | $F_{resonance}$ (kHz) | Commercial $F_{resonance}$ (kHz) |
|---|---|---|---|---|---|---|---|---|
| 30 | 3 | 1.5 | 1.05838 | 2.30E+04 | 1.11859 | 3.39E+04 | 244.088 | 40-90 |
| 17.5 | 3 | 1.5 | 2.23328 | 1.33E+04 | 1.80824 | 2.15E+04 | 371.511 | 75-130 |
| 17.5 | 4 | 1.5 | 2.30484 | 1.29E+04 | 2.34307 | 1.71E+04 | 377.612 | 75-130 |
| 7.5 | 6 | 1.5 | 5.15112 | 6.92E+03 | 4.96888 | 7.21E+03 | 591.361 | 150-160 |
| 7.5 | 8 | 1.5 | 5.27439 | 6.77E+03 | 5.73651 | 5.97E+03 | 598.839 | 150-160 |
| 2.5 | 14 | 1.5 | 8.67034 | 4.47E+03 | 8.58687 | 3.18E+03 | 787.788 | 135-205 |

Figure 2:
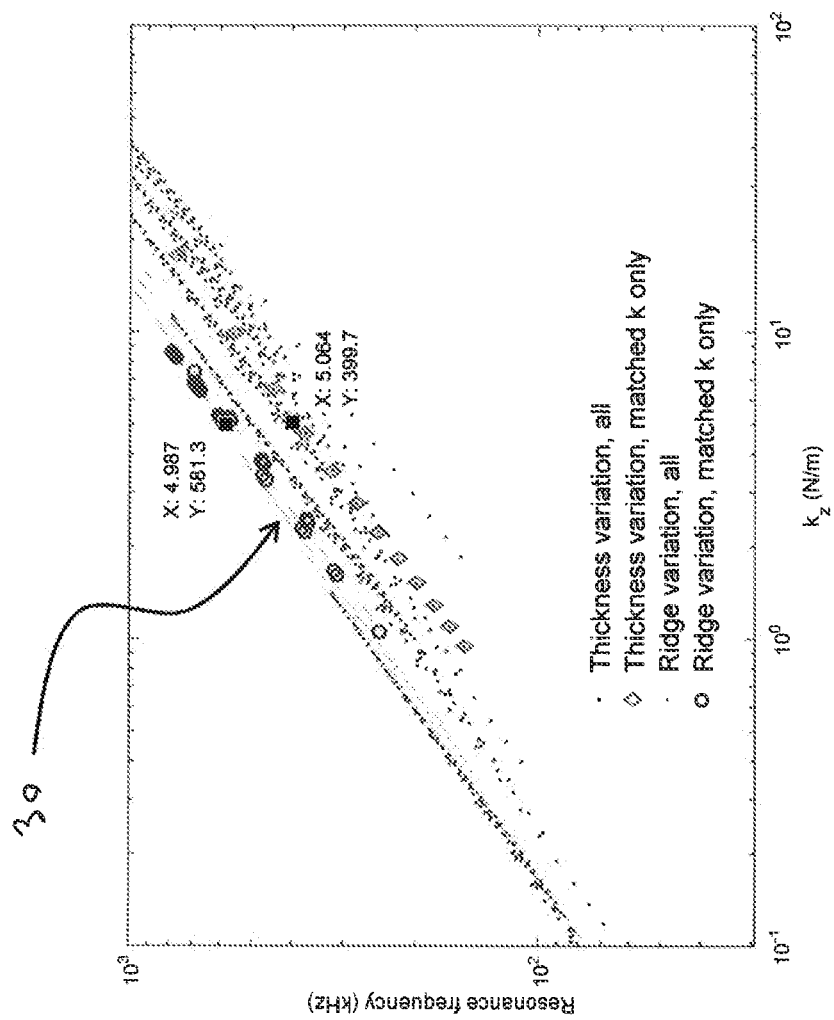
FIG. 2 is a graph of simulation results showing dependency of a resonance frequency of a cantilever to the absence or presence of a ridge/T-shape and to the vertical bending stiffness.

FIG. 2 is a graph of measurement results showing dependency of a resonance frequency of a cantilever to the absence or presence of a ridge or T-shape and to the vertical bending stiffness. The vertical bending stiffness is plotted on the horizontal axis in FIG. 2, the vertical axis provides the resonance frequency in kilohertz (kHz). Reference numeral 30 generally indicates the simulated embodiments wherein a ridge 11 was present in order to increase the vertical bending stiffness to match the effective lateral stiffness. The measurements indicated by diamonds in the plot only had variations in the thickness d of the base plate 10 to match the vertical bending stiffness. Clearly, the embodiments indicated by the circles 30 show a significant higher resonance frequency, which is advantageous.

Figure 3:
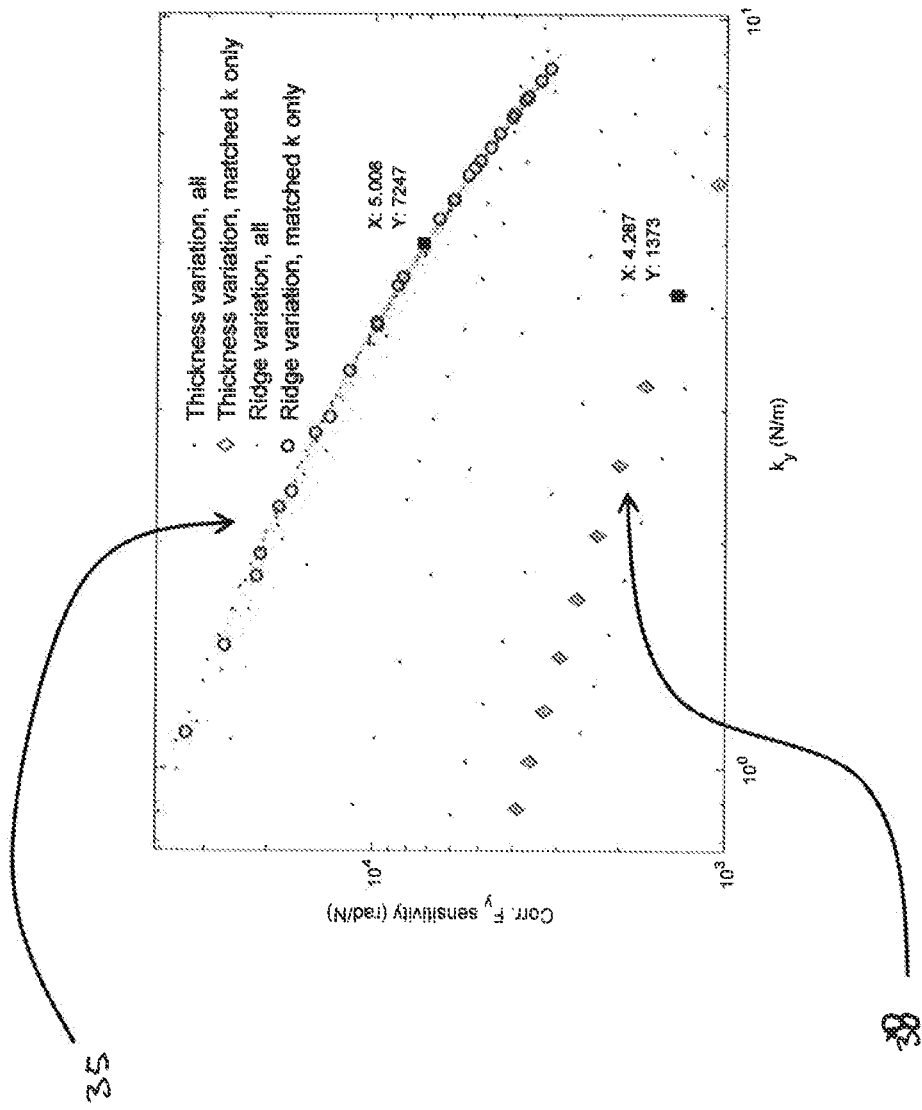
FIG. 3 is a graph of simulation results showing a higher sensitivity of the probe to lateral forces on the tip.

FIG. 3 is a graph of measurement results showing a higher sensitivity of the probe to lateral forces on the tip. The reference numeral 35 generally indicates the measurement results (circles) of embodiments wherein the ridge 11 was present, and which had a T-shaped cross section. The reference numeral 38 generally indicates the measurement results (diamonds) wherein no ridge 11 was present in the neck section 8 or paddle section 9, and wherein only the thickness d of the base part 10 was varied to match the vertical bending stiffness and the lateral stiffness. The plot in FIG. 3 shows a significant improvement in sensitivity of the cantilever response to lateral forces $F_y$, which is in particular useful in sensing lateral directed shear waves or surface waves and for sensing high aspect ratio features on the surface by lateral tilting of the of the cantilever along its longitudinal axis.

Further improvements may be achieved by the following additional design measures that may be applied during manufacturing of a probe. The design may be adapted such as to concentrate torsion in neck section 8. For example this may be achievable by adding additional ribs to the paddle section 9. This results in higher stiffness but not too much mass gain. The length of the cantilever 3 may further be kept to a minimum. For example, in accordance with some embodiments only as much length as needed may be used to accommodate low torsional stiffness. This will maximize $F_z$ sensitivity, i.e. sensitivity to vertical forces. It will also help to bring the required z stiffness up to the required value with ridge 11. Moreover, the neck width $W_N$ may be kept small as well, but may be increased if additional torsion stiffness is required. Furthermore, the tip mass may be reduced by improving its aspect ratio. This will significantly benefit the resonance frequency. Further benefits may be achieved by using a thinner plate for the base part 10, as in that case a shorter neck length is required and the torsional stiffness will be lower. Moreover, a thinner plate thickness further reduces the mass of the probe.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A probe for use in a scanning probe microscopy device for measuring features on a surface of a substrate, the probe comprising:
   a cantilever having a longitudinal shape and including a first end section and a second end section on an opposite side from the first end section; and
   a probe tip located at the first end section of the cantilever, wherein the cantilever is configured for bending in a Z-direction perpendicular to the surface of the substrate in use,
   wherein the cantilever comprises a neck section and a paddle section, wherein the probe tip is located on the paddle section, and wherein the neck section has a width and a height in a cross section thereof, wherein the neck section comprises a base part having a rectangular cross section, wherein the cantilever at least across a length of the neck section comprises a ridge extending in a direction away from the base part, such that the base part and the ridge together define the width and the height of the neck section, and wherein the ridge and the base part have dimensions such that a vertical bending stiffness of the cantilever for bending in the Z-direction matches a lateral stiffness of the cantilever with respect to forces acting on the probe tip in a direction transverse to the Z-direction.

2. The probe according to claim 1, wherein the ridge extends between the probe tip and the second end section of the cantilever.

3. The probe according to claim 1, wherein the neck section, formed by the base part and the ridge, has a T-shaped cross-section.

4. The probe according to claim 1, wherein a width to height aspect ratio of the neck section is defined as a ratio between a maximum width and a maximum height measured in a cross section transverse to a notional longitudinal axis through the neck section, and the width to height aspect ratio of the neck section is calculated as the maximum width divided by the maximum height, wherein the cantilever comprises at least one section having a width to height aspect ratio smaller than 10.

5. The probe according to claim 1; wherein the neck comprises at least one physical property taken from the group consisting of:

the width of the neck section is within a range of 1 micrometer to 15 micrometer;

a thickness of the base part; as measure transverse to the width, is within a range of 250 nanometer to 1250 nanometer;

a length of the neck section is within a range of 2.5 to 30 micrometer;

the height of the ridge is within a range of 2 to 14 micrometer;

the width of the ridge is within a range of 0.5 to 5 micrometer; and a length of the ridge is within a range of 2.5 to 30 micrometer.

6. The probe according to claim 1, wherein the height of the ridge is 1.5 micrometer; and wherein the neck comprises at least one physical dimension combination taken from the group of physical dimension combinations consisting of: the width of the neck section is 3 micrometer and the length of the neck section is 30 micrometer;

the width of the neck section is 3 micrometer and the length of the neck section is 17.5 micrometer;

the width of the neck section is 4 micrometer and the length of the neck section is 17.5 micrometer;

the width of the neck section is 6 micrometer and the length of the neck section is 7.5 micrometer;

the width of the neck section is 8 micrometer and the length of the neck section is 7.5 micrometer; and the width of the neck section is 14 micrometer and the length of the neck section is 2.5 micrometer.

7. The probe according to claim 1, wherein the probe tip comprises a triangular cross section having a base width and an apex.

8. The probe according to claim 7; wherein the probe tip further comprises a high aspect ratio whisker extending from the apex.

9. The probe according to claim 8, wherein the lateral stiffness of the cantilever is of a same order as a lateral stiffness of the whisker.

10. A method of manufacturing a probe for use in a scanning probe microscopy device for measuring high aspect ratio features on a surface of a substrate, the method comprising:

providing the probe that comprises:

a cantilever including a first end section and a second end section on an opposite side from the first end section; and a probe tip, wherein the probe tip is located at the first end section of the cantilever, wherein the cantilever is formed to have a longitudinal shape for enabling bending in a Z-direction perpendicular to the surface of the substrate in use, wherein the providing the probe comprises:

forming the cantilever to comprise a neck section and a paddle section, and forming the probe tip to be located on the paddle section, wherein the neck section is formed to have a width and height in cross section thereof, and wherein the width and height of the neck section are dimensioned such that a vertical bending stiffness of the cantilever for bending in the Z-direction matches a lateral stiffness of the cantilever with respect to forces acting on the probe tip in a direction transverse to the Z-direction.

11. The method according to claim 10, wherein the forming of the cantilever comprises at least one or all of the group consisting of:

adjusting a cross sectional shape of the cantilever, forming the cantilever to have a neck section comprising a ridge extending transverse to a base part of the neck section, and forming the cantilever to have a neck section comprising at least a base part and adjusting a thickness of the base part.

12. The method according to claim 11, wherein the forming of the cantilever comprises forming the cantilever to have a neck section comprising a ridge extending transverse to a base part of the neck section, and wherein the neck section is formed to have a T-shaped cross section.

13. The method according to claim 10; wherein the probe tip is formed to comprise a whisker element; and wherein the method further comprises forming the cantilever to comprise the lateral stiffness to be of a same order as a lateral stiffness of the whisker element.

14. The method according to claim 13; wherein the width and height of the neck section are dimensioned such that a vertical bending stiffness of the cantilever for bending in the Z-direction matches the lateral stiffness of the cantilever with respect to forces acting on the probe tip in a direction transverse to the Z-direction to be at least one of the group consisting of:

within a factor 10 from each other;

within a factor 5 from each other;

within a factor 2 from each other;

within a range of 25% from each other; and within a range of 5% from each other.

15. The method according to claim 10; wherein the neck section is formed comprising a base part having a rectangular cross section; and wherein the cantilever is formed to comprise a ridge at least across a length of the neck section; wherein the ridge extends in a direction away from the base part; such that the base part and the ridge together define the width and height of the neck section; wherein the ridge and the base part have dimensions such that the vertical bending stiffness of the cantilever for bending in the Z-direction matches a lateral stiffness of the cantilever with respect to forces acting on the probe tip in a direction transverse to the Z-direction.

16. Scanning probe microscopy system configured for measuring high aspect ratio features on a surface of a substrate, the system comprising a probe comprising:
- a cantilever having a longitudinal shape and including a first end section and a second end section on an opposite side from the first end section; and
- a probe tip located at the first end section of the cantilever, wherein the cantilever is configured for bending in a Z-direction perpendicular to the surface of the substrate in use,
- wherein the cantilever comprises a neck section and a paddle section, wherein the probe tip is located on the paddle section, and wherein the neck section has a width and a height in a cross section thereof,
- wherein the neck section comprises a base part having a rectangular cross section,
- wherein the cantilever at least across a length of the neck section comprises a ridge extending in a direction away from the base part, such that the base part and the ridge together define the width and the height of the neck section, and
- wherein the ridge and the base part have dimensions such that a vertical bending stiffness of the cantilever for bending in the Z-direction matches a lateral stiffness of the cantilever with respect to forces acting on the probe tip in a direction transverse to the Z-direction.

17. The method according to claim 10, wherein the probe tip is formed to comprise a whisker element, and wherein the method further comprises forming the cantilever to comprise the lateral stiffness to be within 125% of the lateral stiffness of the whisker element.

18. The method according to claim 10, wherein the probe tip is formed to comprise a whisker element, and wherein the method further comprises forming the cantilever to comprise the lateral stiffness to be smaller than or equal to the lateral stiffness of the whisker element.

19. The probe according to claim 8, wherein the lateral stiffness of the cantilever is within 125% of the lateral stiffness of the whisker.

20. The probe according to claim 8, wherein the lateral stiffness of the cantilever is smaller than or equal to the lateral stiffness of the whisker.

* * * * *